(12) United States Patent
Kim et al.

(10) Patent No.: US 10,523,926 B2
(45) Date of Patent: Dec. 31, 2019

(54) BACKLIGHT UNIT AND HOLOGRAPHIC DISPLAY INCLUDING THE SAME

(71) Applicant: SAMSUNG ELECTRONICS CO., LTD., Suwon-si (KR)

(72) Inventors: Sunil Kim, Seoul (KR); Chilsung Choi, Suwon-si (KR); Jungkwuen An, Cheonan-si (KR); Alexander V. Morozov, Moscow area (RU); Hongseok Lee, Seongnam-si (KR); Andrey N. Putilin, Moscow (RU); German B. Dubinin, Moscow area (RU); Sergey E. Dubynin, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 480 days.

(21) Appl. No.: 14/673,987

(22) Filed: Mar. 31, 2015

(65) Prior Publication Data

US 2016/0065955 A1 Mar. 3, 2016

(30) Foreign Application Priority Data

Sep. 1, 2014 (KR) ........................ 10-2014-0115687

(51) Int. Cl.
*H04N 13/32* (2018.01)
(52) U.S. Cl.
CPC .................................. *H04N 13/32* (2018.05)
(58) Field of Classification Search
CPC ........... H04N 13/0418; H04N 13/0452; H04N 13/044; H04N 13/007; H04N 13/32; H04N 13/00; H04N 13/04; G02B 6/0025; G02B 6/003; G02B 6/0031; G02B 6/0053; G02B 6/0068; G02B 6/0083; G02B 6/002; G02B 27/2264; G02B 27/0093; G02B 26/105;
(Continued)

(56) References Cited

U.S. PATENT DOCUMENTS 5,854,697 A 12/1998 Caulfield et al.
7,502,168 B2 * 3/2009 Akutsu ................ G02B 5/1861
359/15
(Continued)

FOREIGN PATENT DOCUMENTS

JP 2012-114039 A 6/2012
KR 10-2012-0046904 A 5/2012
(Continued)

OTHER PUBLICATIONS

Leister et al., "Holographic 3D Displays from SeeReal: Developments, Improvements, Progress", IMID 2009 Digest, pp. 1179-1182, Dresden, Germany.
(Continued)

*Primary Examiner* — Dramos Kalapodas
(74) *Attorney, Agent, or Firm* — Sughrue Mion, PLLC (57) ABSTRACT

Provided are a backlight unit and a holographic display including the same. The backlight unit may include: a light guide plate; a light source unit configured to adjust a direction of light which is emitted from the light source unit and incident on the light guide plate; and a diffraction device which is disposed on the light guide plate and configured to control a direction of light emitted from the light guide plate.

22 Claims, 8 Drawing Sheets

(58) Field of Classification Search
CPC ............ G02B 26/005; G02B 2207/115; G02B 27/225; G02B 27/2242; G02B 27/022; G02B 5/1861; G02B 2027/0116; G02B 2027/0125; G02B 27/0172; G02B 2027/0174; G02B 5/32; G02B 5/18; G02B 27/14; G02B 27/2228; G02B 27/0103; G02B 27/24; G03H 1/2286; G03H 1/0005; G03H 1/2294; G03H 2001/2242; G03H 2001/2226; G03H 2222/34; G03H 2223/23; G03H 2225/33; G03H 1/265; G03H 1/26; G09G 2320/0233; G09G 2310/024; G09G 3/342; G09G 2310/0235; G02F 2001/133601; G02F 1/133615; G11B 7/08564; G11B 7/0065; G02C 7/00; G02C 7/02; G02C 3/00
See application file for complete search history.

(56) References Cited

U.S. PATENT DOCUMENTS

| | | | | |
|---|---|---|---|---|
| 7,688,509 | B2* | 3/2010 | Vissenberg | G02B 26/005 345/6 |
| 7,944,428 | B2* | 5/2011 | Travis | G02B 6/002 345/102 |
| 8,861,090 | B2* | 10/2014 | Mukawa | G02B 27/0103 359/630 |
| 2005/0088545 | A1* | 4/2005 | Ito | G02B 5/32 348/239 |
| 2009/0245730 | A1* | 10/2009 | Kleemann | G02B 5/1861 385/37 |
| 2014/0043320 | A1* | 2/2014 | Tosaya | G02B 27/0172 345/419 |
| 2014/0055692 | A1* | 2/2014 | Kroll | G02F 1/1347 349/15 |
| 2014/0098010 | A1* | 4/2014 | Travis | G02B 26/005 345/32 |
| 2015/0229897 | A1* | 8/2015 | Mukawa | H04N 9/73 345/593 |
| 2015/0277126 | A1* | 10/2015 | Hirano | G02B 7/008 359/633 |
| 2016/0349508 | A1* | 12/2016 | Horikawa | G02B 27/10 |
| 2016/0353092 | A1* | 12/2016 | Bruder | H04N 13/39 |

FOREIGN PATENT DOCUMENTS

| | | |
|---|---|---|
| KR | 10-2012-0133668 A | 12/2012 |
| KR | 10-2013-0022900 A | 3/2013 |

OTHER PUBLICATIONS

Armin Schwerdtner et al., "25.2: Eye-Tracking Solutions for Real-Time Holographic 3-D Display", SID Symposium Digest, 2008, pp. 345-347.

* cited by examiner

BACKLIGHT UNIT AND HOLOGRAPHIC DISPLAY INCLUDING THE SAME

CROSS-REFERENCE TO RELATED APPLICATION

This application claims priority from Korean Patent Application No. 10-2014-0115687, filed on Sep. 1, 2014 in the Korean Intellectual Property Office, the disclosure of which is incorporated herein in its entirety by reference.

BACKGROUND

1. Field

The present disclosure relates to a backlight unit capable of controlling a direction of light, and a holographic display including the same.

2. Description of the Related Art

Many 3-dimensional (3D) movies have been released recently, and accordingly, technologies related to 3D image display apparatuses are being studied. Since a 3D image display apparatus displays a 3D image based on binocular parallax, a currently commercialized 3D image display apparatus using binocular parallax of both eyes provides a 3D effect to a viewer by providing a left-eye image and a right-eye image having different viewpoints respectively to a left eye and a right eye of the viewer. Examples of such a 3D image display apparatus include a glass-type 3D image display apparatus that requires 3D glasses, and an autostereoscopic 3D image display apparatus that does not require 3D glasses.

However, when a 3D image is viewed via a binocular parallax method, the eyes of a viewer easily get tired, and since a 3D image display apparatus that provides only two viewpoints via a left-eye image and a right-eye image is unable to reflect a change of a viewpoint according to movement of the viewer, a natural 3D effect may be limited.

Thus, in order to display a natural 3D image, a holographic display is being studied. However, the holographic display has a narrow viewing angle, and thus a viewable area is limited.

SUMMARY

Provided is a backlight unit capable of controlling a direction of light.

Provided is a holographic display capable of changing a location of a viewing area by controlling a direction of light.

Additional aspects will be set forth in part in the description which follows and, in part, will be apparent from the description, or may be learned by practice of the presented exemplary embodiments.

According to an aspect of an exemplary embodiment, a backlight unit includes: a light guide plate; a light source unit configured to adjust a direction of emitted light which is emitted from the light source unit and incident on the light guide plate; and a diffraction device which is disposed on the light guide plate and configured to control a direction of light emitted from the light guide plate.

The light source unit may include a plurality of light sources, and each of the plurality of light sources may be arranged to have different light output directions.

The light source unit may include: at least one light source; and a beam steering unit that adjusts a light output direction of the at least one light source.

The beam steering unit may include a first driver that rotates the at least one light source.

The beam steering unit may include: a mirror that reflects light emitted from the at least one light source to be incident on the light guide plate; and a second driver that rotates the mirror.

The beam steering unit may include: a refraction surface that refracts light emitted from the at least one light source to be incident on the light guide plate; and an active optical element that adjusts an incidence angle of light incident on the light guide plate based on a tilt angle of the refraction surface.

The active optical element may include an electrowetting prism or a refractive index converting device.

The active optical element may include a first medium and a second medium which are stacked on each other and form the refraction surface over which the first medium and the second medium contact.

The tilt angle of the refraction surface may be controlled by a voltage applied to the active optical element.

The light source unit may include a coherent light source.

The light guide plate may be integrated with the diffraction device.

The backlight unit may further include: a 2-dimensional (2D) light guide plate disposed below the light guide plate; and a light source that radiates light to the 2D light guide plate.

According to an aspect of another exemplary embodiment, a holographic display includes: a light guide plate; a light source unit configured to adjust a direction of light which is emitted from the light source unit and incident on the light guide plate; a diffraction device which is disposed on the light guide plate and configured to control a direction of light emitted from the light guide plate; and a spatial light modulator that displays a holographic image by modulating a beam that passed through the diffraction device.

The holographic display may further include: a sensor capable of tracking the eyes of a viewer; and a controller that controls the light source unit such that the direction of the emitted light from the light source unit is adjusted according to a signal detected by the sensor.

The holographic display may further include an image board that inputs a computer-generated hologram image signal to the spatial light modulator.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings.

In drawings, like reference numerals refer to like elements and sizes or thickness of elements may be exaggerated for clarity. In this regard, the present exemplary embodiments may have different forms and should not be construed as being limited to the descriptions set forth herein. For example, when a layer is disposed "on" a substrate or another layer, the layer may be directly disposed on the substrate or the other layer, or an intervening layer may exist. Expressions such as "at least one of," when preceding a list of elements, modify the entire list of elements and do not modify the individual elements of the list.

Figure 1:
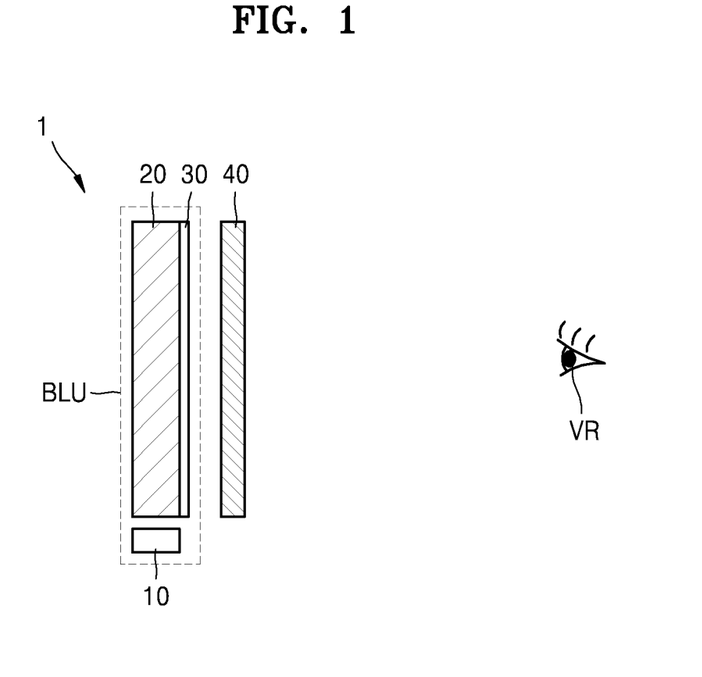
FIG. 1 illustrates a holographic display according to an exemplary embodiment.

FIG. 1 illustrates a holographic display 1 according to an exemplary embodiment.

The holographic display 1 may include a backlight unit BLU that radiates light, and a spatial light modulator 40 that displays an image by modulating the light from the backlight unit BLU.

The backlight unit BLU may include a light source unit 10 that radiates light, a light guide plate 20, and a diffraction device 30 capable of controlling light emitted from the light guide plate 20.

The light source unit 10 may adjust a direction of light incident on the light guide plate 20 such that an incidence angle of the light changes. The light source unit 10 may be disposed adjacent to the light guide plate 20. For example, the light source unit 10 may be disposed at a side portion or a side of one surface of the light guide plate 20. In FIG. 1, the light guide plate 20 is disposed at the bottom in a direction a viewer VR views the holographic display 1. The holographic display 1 may be applied to, for example, a television (TV), a computer monitor, a tablet, or a mobile phone.

Figure 2:
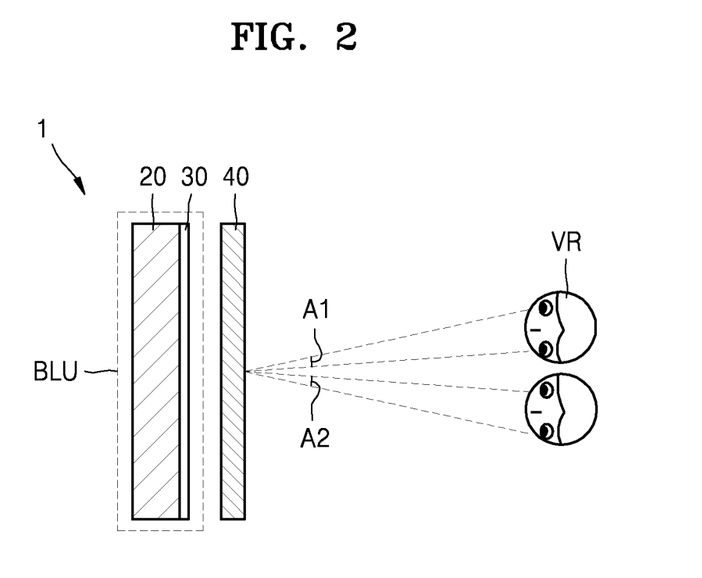
FIG. 2 is a plan view of the holographic display of FIG. 1.

FIG. 2 is a plan view of the holographic display 1 of FIG. 1. Light emitted from the light source unit 10 may be incident on the light guide plate 20, and the light may be totally reflected at the light guide plate 20 and then incident on the spatial light modulator 40 through the diffraction device 30. The light guide plate 20 may enable light to be totally reflected in the light guide plate 20 according to an incidence angle of the light. In the light guide plate 20, some light may be totally reflected and some light may be emitted, and thus light may be uniformly transmitted to an entire surface of the light guide plate 20. The backlight unit BLU may operate as a surface light source by using the light guide plate 20.

The diffraction device 30 may adjust a light output direction of light. The diffraction device 30 may change a direction in which light is emitted according to an angle of light incident on the diffraction device 30. An emission direction of light that passed through the light guide plate 20 and the diffraction device 30 may change according to a change of an incidence angle of light incident on the light guide plate 20 from the light source unit 10. In FIG. 1, the diffraction device 30 is disposed on one surface of the light guide plate 20, but alternatively, the diffraction device 30 may be disposed on two surfaces of the light guide plate 20.

The spatial light modulator 40 may form an image by using light emitted through the diffraction device 30. For example, the spatial light modulator 40 may receive a holographic image signal and change at least one of the amplitude and phase of light from the diffraction device 30 according to the holographic image signal. The light modulated by the spatial light modulator 40 may form a 3-dimensional (3D) image. The spatial light modulator 40 may include, for example, a photoelectric material layer that is capable of changing a refractive index thereof according to an electric signal. The spatial light modulator 40 may include, for example, a liquid crystal layer. When a voltage is applied to the photoelectric material layer, a refractive index of the spatial light modulator 40 changes, and thus at least one of the amplitude and phase of emitted light may be controlled. The spatial light modulator 40 may include a plurality of pixels, wherein the plurality of pixels may be arranged in a 2D matrix form.

Operations of the holographic display 1, according to an exemplary embodiment, will now be described with reference to FIGS. 1 and 2.

Light emitted from the light source unit 10 is transmitted to the light guide plate 20, may be uniformly transmitted to an entire surface of the light guide plate 20, and then may be incident on the diffraction device 30. The diffraction device 30 may diffract light in a certain direction according to an incidence angle of the light. For example, light having a first incidence angle may be diffracted in a first direction through the diffraction device 30, and light having a second incidence angle may be diffracted in a second direction through the diffraction device 30. A location of a viewing area of an image formed by the spatial light modulator 40 may change as a diffraction direction changes. For example, light incident on the diffraction device 30 in the first incidence angle may pass through the spatial light modulator 40 to display an image in a first viewing area A1, and light incident on the diffraction device 30 in the second incidence angle may pass through the spatial light modulator 40 to display an image in a second viewing area A2.

An incidence angle of light incident on the diffraction device 30 may be adjusted by the light source unit 10. Accordingly, the light source unit 10 may adjust an incidence angle of light incident on the light guide plate 20 so as to finally adjust a location of a viewing area of an image.

A viewing angle may be increased when a pixel size of the holographic display 1 is decreased. However, since decreasing of the pixel size is limited, increasing of the viewing angle may be limited. Thus, a location of a viewing area may be changed according to a location of the viewer VR, thereby increasing a viewing angle.

Figure 3:
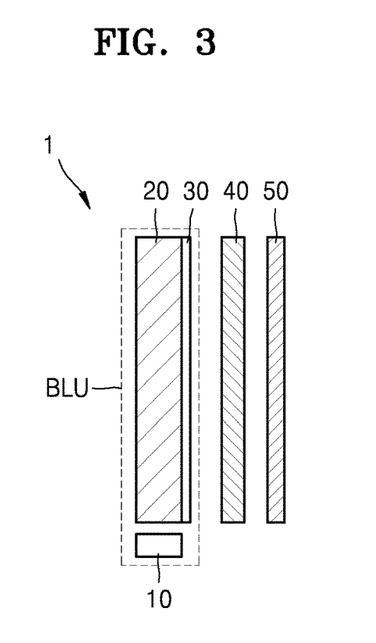
FIG. 3 illustrates the holographic display of FIG. 1 including a field lens.

FIG. 3 illustrates the holographic display 1 of FIG. 1 including a field lens 50 next to the spatial light modulator 40. The field lens 50 may be a condensing lens for concentrating light emitted from the backlight unit BLU to a viewing area. For example, the field lens 50 may be a diffractive optical element or holographic optical element, wherein a phase of a lens is recorded on a plane.

Figure 4:
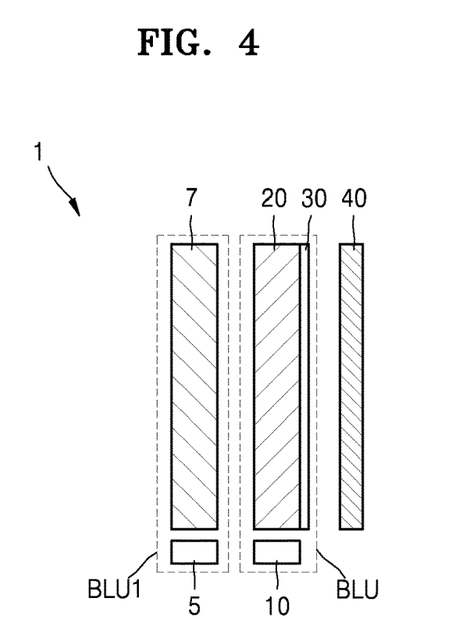
FIG. 4 illustrates the holographic display of FIG. 1 including a 2-dimensional (2D) backlight unit.

FIG. 4 illustrates the holographic display 1 of FIG. 1 including a 2D backlight unit BLU1. The holographic display 1 of FIG. 4 may include the backlight unit BLU for a hologram, and the 2D backlight unit BLU1. The 2D backlight unit BLU1 may include, for example, a light source 5 and a light guide plate 7. The light source 5 may include, for example, a light-emitting device (LED). The light source 5 may not be a coherent light source. When a holographic image is displayed, the light source unit 10 of the backlight unit BLU is turned on and the light source 5 of the 2D backlight unit BLU1 is turned off. When a 2D image is displayed, the light source unit 10 of the backlight unit BLU is turned off and the light source 5 of the 2D backlight unit BLU1 is turned on. Light emitted from the light source 5 passes through the light guide plate 7 and is transmitted to the light guide plate 20 of the backlight unit BLU. Since the light guide plate 20 is formed of a transparent material, the light may pass through the light guide plate 20 and is transmitted to the diffraction device 30. Since the light may be perpendicularly transmitted to the diffraction device 30, the light may be transmitted to the spatial light modulator 40 through the diffraction device 30. A 2D image signal may be input to the spatial light modulator 40 and the light may be modulated according to the 2D image signal to display a 2D image. According to the holographic display 1 of FIG. 4, a 2D image and a holographic 3D image may be selectively displayed.

Figure 5:
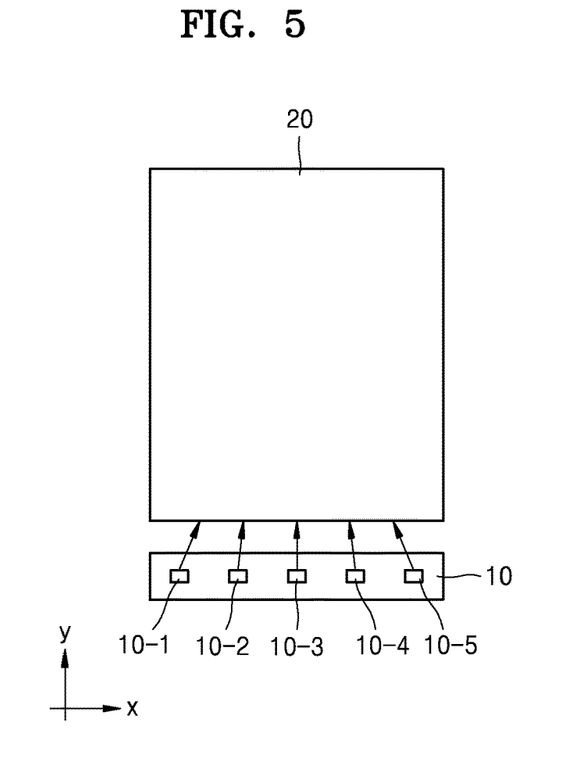
FIG. 5 is a schematic front view of a holographic display according to an exemplary embodiment.

FIG. 5 illustrates the light source unit 10 disposed below the light guide plate 20 in a direction a viewer views a display. However, a location of the light source unit 10 is not limited thereto, and the light source unit 10 may be disposed at a side portion of the light guide plate 20. The light source unit 10 may include, for example, a plurality of light sources, and light from the plurality of light sources may be transmitted to the light guide plate 20 at different angles.

For example, the light source unit 10 may include first through fifth light sources 10-1 through 10-5. The first through fifth light sources 10-1 through 10-5 may be light sources irradiating coherent light. For example, the first through fifth light sources 10-1 through 10-5 may be lasers. The first through fifth light sources 10-1 through 10-5 may be short-wavelength light sources or light sources that radiate white light by composing colored lights.

For example, the first through fifth light sources 10-1 through 10-5 may be arranged such that incidence angles of light from the first through fifth light sources 10-1 through 10-5 to the light guide plate 20 are different from each other. One of the first through fifth light sources 10-1 through 10-5 may be turned on and the other ones of the first through fifth light sources 10-1 through 10-5 may be turned off according to a location of the viewer. When the first through fifth light sources 10-1 through 10-5 are sequentially turned on, a location of a viewing area may move in a horizontal direction of a display. A sensor 250 as shown in FIG. 5 may detect the location of the viewer or the pupils of the viewer so that the light sources 10-1 to 10-5 may be turned on and off based on information of the detected location.

A relationship between an incidence angle of light from a light guide plate WG to a diffraction device G and a diffraction angle of the diffraction device G will now be described with reference to FIGS. 6 through 8.

Figure 6:
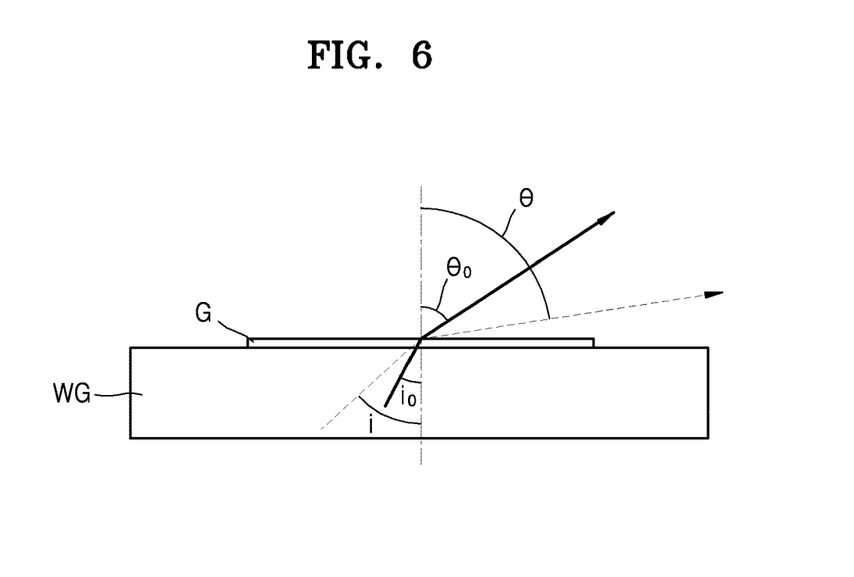
FIG. 6 illustrates an incidence angle and a diffraction angle of light incident on a diffraction device in a light guide plate.
Figure 7:
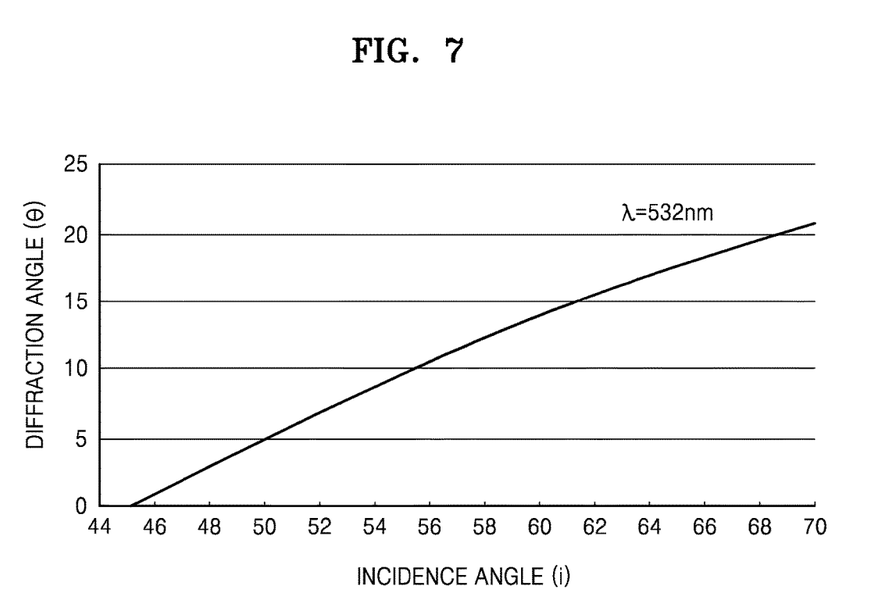
FIG. 7 is a graph showing a change of a diffraction angle with respect to an incidence angle of light incident on a diffraction device in a light guide plate.

As shown in FIG. 6, the diffraction device G is disposed on the light guide plate WG, and light transmitted from the light guide plate WG may be emitted through the diffraction device G. When light is transmitted from the light guide plate WG to the diffraction device G, $i_0$ denotes an incidence angle of the light and $\theta_0$ denotes a diffraction angle of the light. When the incidence angle changes from $i_0$ to i, the diffraction angle may also change from $\theta_0$ to $\theta$. FIG. 7 is a graph showing change of a diffraction angle $\theta$ with respect to an incidence angle i. Here, light having a wavelength $\lambda$ of 532 nm may be used. As shown in FIG. 7, the diffraction angle $\theta$ increases as the incidence angle i increases. In other words, the diffraction angle $\theta$ may be directly proportional to the incidence angle i.

Figure 8:
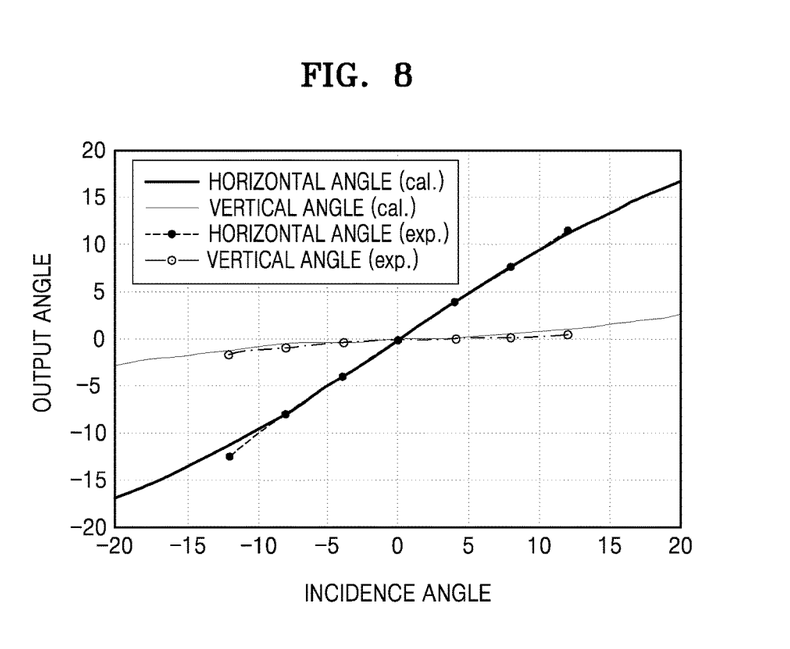
FIG. 8 is a graph showing a change of an output angle of light emitted from a holographic display with respect to an incidence angle of light incident on a light guide plate.

FIG. 8 is a graph showing change of an output angle of light emitted from a diffraction device with respect to an incidence angle of light incident on a light guide plate. The output angle is shown in results (exp) and theoretical values (cal) of measuring an angle (horizontal angle) with respect to a horizontal direction of the diffraction device and an angle (vertical angle) with respect to a vertical direction of the diffraction device. In the horizontal angles, the output angle changes according to the incidence angle, but in the vertical angles, the output angle also changes according to the incidence angle but a variation in the vertical angles is relatively small than that in the horizontal angles.

When a viewer moves while viewing a holographic display, the viewer mostly moves in a horizontal direction, and thus a location of a viewing area moves in a horizontal direction, thereby reducing a limitation to the viewing angle according to a change of a location of the viewer.

As described above, according to a holographic display according to an exemplary embodiment, a light source unit adjusts an incidence angle of light transmitted to a light guide plate so as to adjust an emission direction of light emitted from a diffraction device, thereby changing a location of a viewing area.

Figure 9:
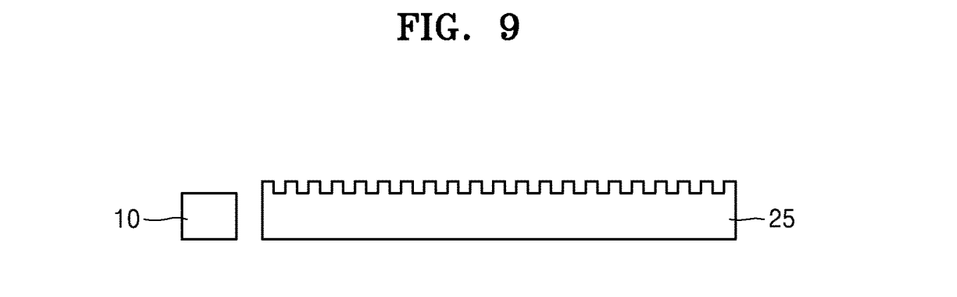
FIG. 9 illustrates a light guide plate that is integrated with a diffraction device.

FIG. 9 illustrates a light guide plate 25 that is integrated with a diffraction device. As one exemplary embodiment, the light guide plate 20 and the diffraction device 30 of FIG. 1 are separately formed. However, as shown in FIG. 9, the light guide plate 20 and the diffraction device 30 may be integrated. For example, a diffraction grating, which performs functions of the diffraction device 30, may be formed on the body of the light guide plate 25. When the light guide plate 25 is integrated with the diffraction device 30 through the diffraction grating, the thickness of the holographic display 1 and manufacturing costs may be reduced.

Figure 10:
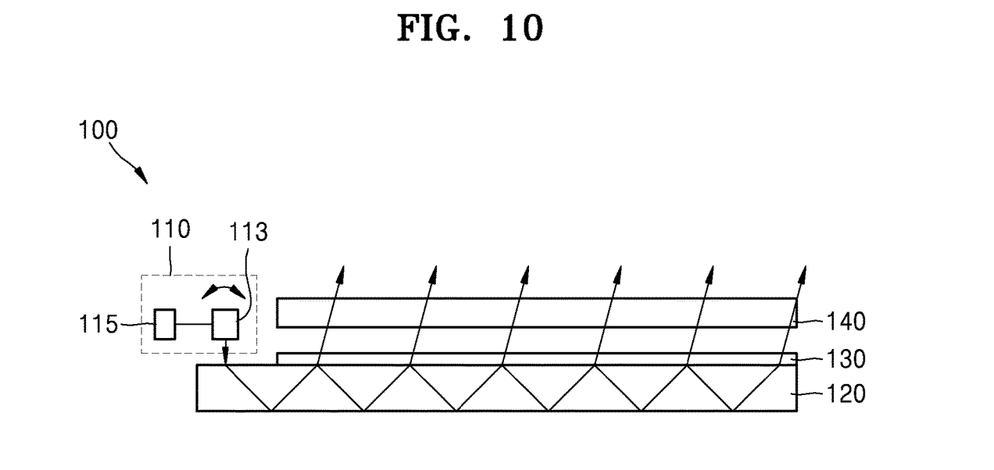
FIG. 10 illustrates a holographic display according to another exemplary embodiment.

FIG. 10 illustrates a holographic display 100 according to another exemplary embodiment. The holographic display 100 may include a backlight unit that radiates light, and a spatial light modulator 140 that modulates the light from the backlight unit to display an image.

The backlight unit may include a light source unit 110 that radiates light, a light guide plate 120, and a diffraction device 130 that is capable of controlling a direction of light emitted from the light guide plate 120. The light source unit 110 may include a light source 113 that radiates light and a beam steering unit 115 that changes a direction of light emitted from the light source 113 by rotating the light source 113. The light source unit 110 may be disposed at an upper side region of the light guide plate 120. The diffraction device 130 may be disposed at the remaining upper side region of the light guide plate 120 minus the upper side region where the light source unit 110 is disposed. Since the light guide plate 120, the diffraction device 130, and the spatial light modulator 140 are the same as those described above with reference to FIG. 1, details thereof are not provided again.

Light emitted from the light source 113 may be transmitted to the light guide plate 120, and an emission direction of light transmitted through the light guide plate 120 may be adjusted by the diffraction device 130 such that the light is transmitted to the spatial light modulator 140. The spatial light modulator 140 may form and display a 3D image by using the light.

The beam steering unit 115 may, for example, rotate the light source 113. When the light source 113 is rotated by the beam steering unit 115, an incidence angle of light from the light source 113 to the light guide plate 120 changes, and according to a change of the incidence angle, an emission direction of light emitted through the light guide plate 120 and the diffraction device 130 may change. As a result, a viewing area of a 3D image may change.

Figure 11:
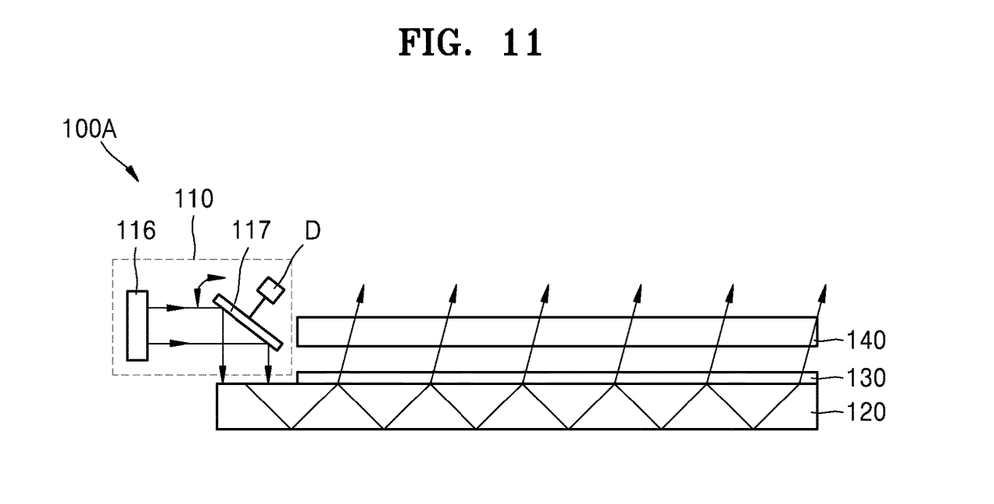
FIG. 11 illustrates a holographic display wherein a light source unit is modified according to an exemplary embodiment.

FIG. 11 is a diagram of a holographic display 100A wherein the light source unit 110 of FIG. 10 is modified according to an exemplary embodiment.

As shown in FIG. 11, the light source unit 110 may include a light source 116 that radiates light and a beam steering unit that changes a direction of light emitted from the light source 116 by rotating the beam steering unit itself. The beam steering unit may include a mirror 117 that reflects light and a driver D that rotates the mirror 117. The mirror 117 may be, for example, a galvano mirror. Light emitted from the light source 116 may be reflected at the mirror 117 and transmitted to the light guide plate 120. An emission direction of light transmitted through the light guide plate 120 may be adjusted by the diffraction device 130 such that the light is transmitted to the spatial light modulator 140. The spatial light modulator 140 may form and display a 3D image by using the light.

When the mirror 117 rotates, an incidence angle of light emitted from the light source 116 with respect to the light guide plate 120 is changed, and according to a change of the incidence angle, an emission direction of light emitted through the light guide plate 120 and the diffraction device 130 may change. As a result, a viewing area of a 3D image may change.

In FIG. 11, the holographic display 100A includes one mirror 117, but may alternatively include a plurality of mirrors, including the mirror 117. For example, an optical path may be changed by using the plurality of mirrors, thereby efficiently modifying an arrangement of the light source unit 110.

Figure 12:
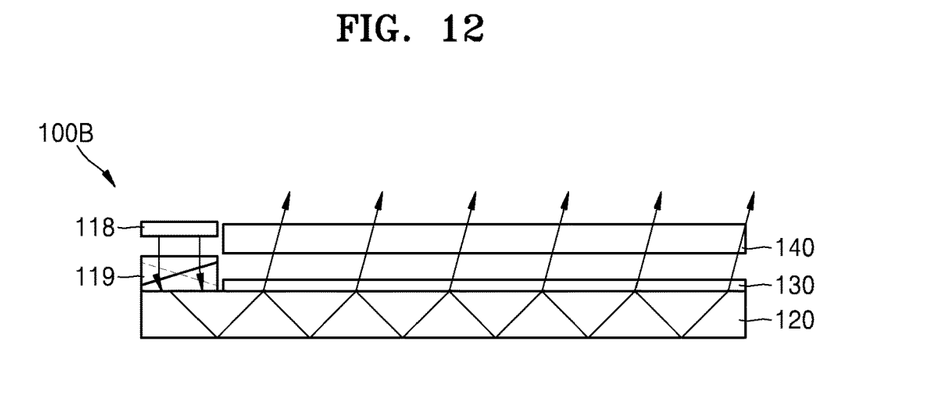
FIG. 12 illustrates a holographic display wherein a light source unit is modified according to another exemplary embodiment.

FIG. 12 is a diagram of a holographic display 100B wherein the light source unit 110 of FIG. 10 is modified according to another exemplary embodiment.

As shown in FIG. 12, the light source unit 110 may include a light source 118 that radiates light and a beam steering unit 119 that changes a direction of the light. The beam steering unit 119 may include an active optical element. The active optical element may include, for example, a refraction surface that refracts light emitted from the light source 118 to be transmitted to the light guide plate 120, wherein the refraction surface may change to adjust an incidence angle of the light transmitted to the light guide plate 120.

The active optical element may include, for example, an electrowetting prism or a refractive index converting device. In the electrowetting prism, surface tension of a fluid changes when an electric field is applied to a surface of the fluid. The refractive index converting device may include, for example, a liquid crystal of which a refractive index changes when a voltage is applied or a photoconductive material of which a refractive index changes when light is radiated thereto.

Figure 13:
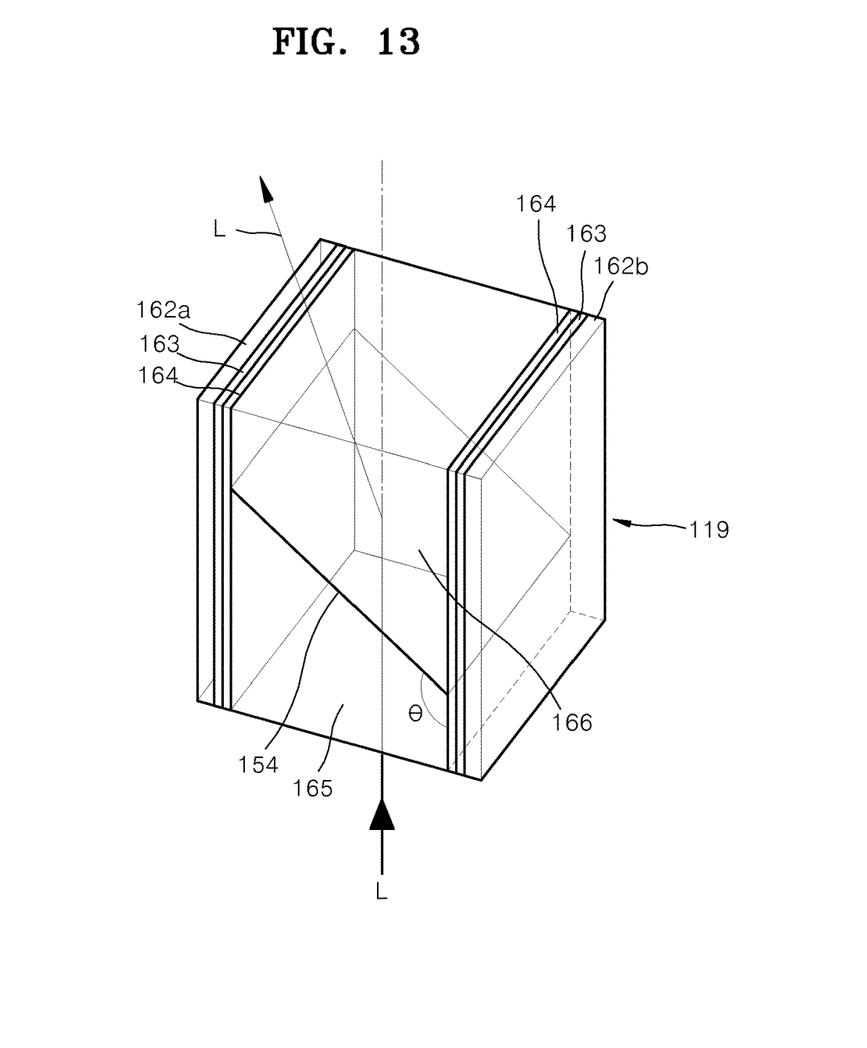
FIGS. 13 and 14 illustrate an electrowetting prism included in the holographic display of FIG. 12, according to an exemplary embodiment.
Figure 14:
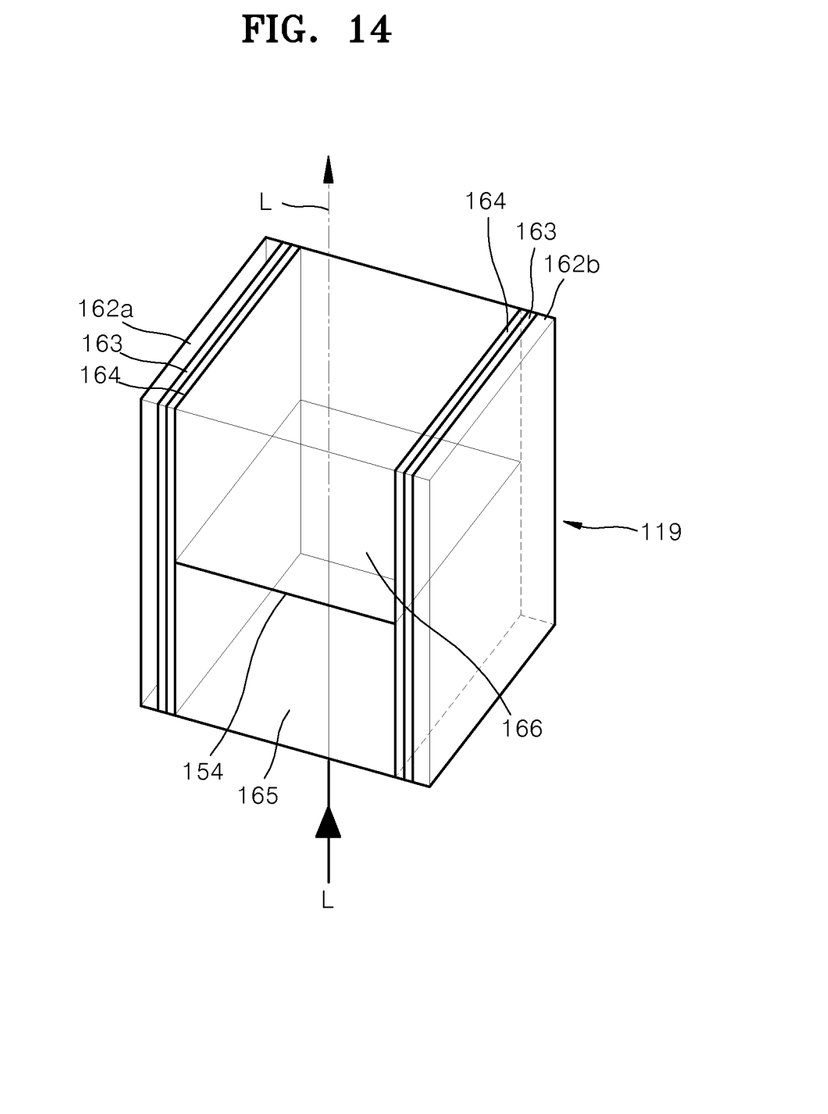

FIGS. 13 and 14 are diagrams of an electrowetting prism used as the beam steering unit 119, for example, an active optical element, according to an exemplary embodiment. Here, the same reference number, 119, is used for the active optical element 119 and the beam steering unit 119. As shown in FIG. 13, the active optical element 119 may include a first electrode 162a and a second electrode 162b, which face each other. A first medium 165 and a second medium 166 having different refractive indexes may be disposed between the first and second electrodes 162a and 162b. For example, the first medium 165 may be a nonpolar fluid and the second medium 166 may be a polarized fluid. For example, the first medium 165 may be oil and the second medium 166 may be water or salt water. An interface between the first and second media 165 and 166 is a refractive surface 154. A hydrophobic film 164 may be disposed on an inner surface of each of the first and second electrodes 162a and 162b. An insulating layer 163 may be disposed between the first electrode 162a and the hydrophobic film 164 and between the second electrode 162b and the hydrophobic film 164. Alternatively, the insulating layer 163 itself may be formed of a hydrophobic material. In this case, a hydrophobic film is not separately required.

In FIG. 13, two electrodes are used, but the number of electrodes is not limited thereto. For example, an electrode may be disposed on each of four side walls of a prism unit such that the prism unit is driven by the four electrodes.

When a voltage is not applied to the first and second electrodes 162a and 162b, the first medium 165 is tilted at a high contact angle $\theta$ (also referred to as a tilt angle $\theta$) with the hydrophobic film 164. When a voltage is applied to the first and second electrodes 162a and 162b, the contact angle $\theta$ between the hydrophobic film 164 and the first medium 165 decreases, and thus a slope of the refractive surface 154 is changed. When the slope of the refractive surface 154 is changed, a light output direction i.e., a proceeding direction, of light changes. As such, by applying or not applying a voltage to the first and second electrodes 162a and 162b or by adjusting a size of the voltage, the proceeding direction of light may be controlled. In FIG. 13, light L is refracted at the refractive surface 154 and transmitted to the left on the drawing. In FIG. 14, a voltage is applied to the first and second electrodes 162a and 162b such that the refractive surface 154 is parallel to an incidence surface. In this case, the light L may penetrate through the refractive surface 154 at right angles. The slope of the refractive surface 154 may change according to a size and direction of the voltage applied to the first and second electrodes 162a and 162b, and when the slope of the refractive surface 154 changes, a proceeding direction of the light L may be changed.

According to the current embodiment, an incidence angle of light emitted from the light source 118 with respect to the light guide plate 120 is changed by the active optical element 119, and according to a change of the incidence angle, an emission direction of light emitted through the light guide plate 120 and the diffraction device 130 may change. As a result, a viewing area of a 3D image may change.

As described above, a holographic display according to an exemplary embodiment may change an incidence angle of light transmitted to a light guide plate by changing a proceeding direction of light emitted from a light source, by using a beam steering unit. An output angle of the light changes according to a change of the incidence angle, and thus a viewing area of a holographic image may be changed. According to an exemplary embodiment, since the incidence angle of the light is changed by a light source unit and then the light is transmitted through the light guide plate, an overall thickness of the holographic display may be reduced. Also, according to an exemplary embodiment, the quality of a 3D image is not affected compared to when a unit for adjusting a direction of light is disposed in front of or at the rear of a spatial light modulator.

Figure 15:
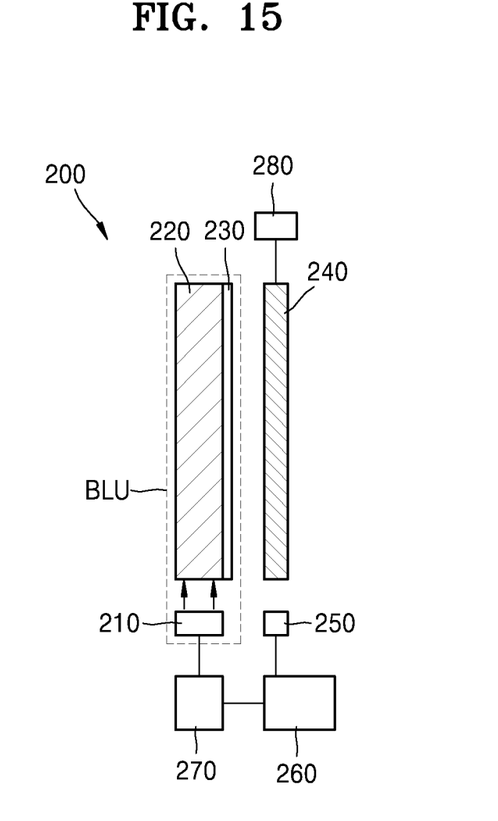
FIG. 15 illustrates a holographic display according to another exemplary embodiment.

FIG. 15 is a diagram of a holographic display 200 according to another exemplary embodiment.

The holographic display 200 may include the backlight unit BLU that radiates light and a spatial light modulator 240 that displays an image by modulating light from the backlight unit BLU. The spatial light modulator 240 may include an image board 280 to which a holographic image signal is input. The image board 280 may be used to input a computer-generated hologram image signal to the spatial light modulator 240.

The backlight unit BLU may include a light source unit 210 that radiates light, a light guide plate 220, and a diffraction device 230 that is capable of controlling a direction of light emitted from the light guide plate 220.

The light source unit 210 may adjust a proceeding direction of light such that an incidence angle of light transmitted to the light guide plate 220 is changed.

The holographic display 200 may further include a sensor 250 for tracking the eyes of a viewer. The sensor 250 may track the eyes via any one of various methods, for example, by detecting light reflected from the eyes or by detecting which direction the eyes are looking by photographing the eyes.

The holographic display 200 may further include a data processor 260 that processes data detected by the sensor 250. For example, the data processor 260 may derive a viewing area of a holographic image corresponding to locations of the eyes by using the data detected by the sensor 250 and derive information about an emission direction of light emitted from the light source unit 210 for displaying the holographic image in the viewing area. The viewing area of the holographic image corresponding to the locations of the eyes and the information about the emission direction may be pre-stored in the data processor 260.

The holographic display 200 may further include a controller 270 that controls a direction of light emitted from the light source unit 210. The controller 270 may receive information about the emission direction from the data processor 260 and control the light source unit 210 such that light is emitted in the emission direction. For example, when the controller 270 receives an instruction to emit light in a first emission direction from the data processor 260, the controller 270 may control the light source unit 210 such that light is emitted in the first emission direction. When the light source unit 210 has the structure shown in FIG. 5, the first light source 10-1 may be turned on and the second through fifth light sources 10-2 through 10-5 may be turned off. Alternatively, when the light source unit 210 has the structure shown in FIG. 10, the light source 113 may move by controlling the beam steering unit 115 such that light is emitted in a direction corresponding to the first emission direction.

The holographic display 200 may further include the 2D backlight unit BLU1 of FIG. 4 below the backlight unit BLU.

As such, by detecting a suitable viewing area according to a location of a viewer and adjusting an image to be displayed in the viewing area, the viewer may conveniently view a holographic image. A holographic image according to an exemplary embodiment may include a backlight unit capable of adjusting a light output direction so as to adjust a location of a viewing area. By adjusting a location of a viewing area according to a location of a viewer, a limitation of a narrow viewing angle may be resolved.

While one or more exemplary embodiments have been described with reference to the figures, it will be understood by those of ordinary skill in the art that various changes in form and details may be made therein without departing from the spirit and scope as defined by the following claims.

What is claimed is:

1. A backlight unit comprising:
   a light guide plate;
   a light source unit configured to emit light to the light guide plate and adjust an incidence direction of the light to be incident on the light guide plate in the incidence direction; and
   a diffraction device which is disposed on and in contact with the light guide plate and configured to control an output direction of the light to be outputted from the diffraction device in the output direction,
   wherein the light source unit is further configured to change an incidence angle of the light to be incident on the light guide plate and the diffraction device is further configured to control the output direction of the light according to the incidence angle of the light, and
   wherein light incident on the diffraction device in a first incidence angle by the light source unit passes through t ea spatial light modulator to display an image in a first viewing area, and light incident on the diffraction device in a second incidence angle by the light source unit passes through the spatial light modulator to display an image in a second viewing area, and
   wherein both the light source unit and the diffraction device are provided in the output direction of the light on the light guide plate and an area of the diffraction device is wider than an area of the light guide plate on which the light from the light source unit is incident.

2. The backlight unit of claim 1, wherein the light source unit comprises a plurality of light sources, and each of the plurality of light sources is arranged to have different light output directions.

3. The backlight unit of claim 1, wherein the light source unit comprises:
   at least one light source; and
   a beam steering unit that adjusts a light output direction of the at least one light source.

4. The backlight unit of claim 3, wherein the beam steering unit comprises a first driver that rotates the at least one light source.

5. The backlight unit of claim 3, wherein the beam steering unit comprises:
   a mirror that reflects the light emitted from the at least one light source to be incident on the light guide plate; and
   a second driver that rotates the mirror.

6. The backlight unit of claim 3, wherein the beam steering unit comprises:
   a refraction surface that refracts light emitted from the at least one light source to be incident on the light guide plate; and
   an active optical element that adjusts an incidence angle of light incident on the light guide plate based on a tilt angle of the refraction surface.

7. The backlight unit of claim 6, wherein the active optical element comprises an electrowetting prism or a refractive index converting device.

8. The backlight unit of claim 6, wherein the active optical element comprises a first medium and a second medium which are stacked on each other and form the refraction surface over which the first medium and the second medium contact.

9. The backlight unit of claim 6, wherein the tilt angle of the refraction surface is controlled by a voltage applied to the active optical element.

10. The backlight unit of claim 1, wherein the light source unit comprises a coherent light source.

11. The backlight unit of claim 1, wherein the diffraction device comprises a diffracting grating that is disposed on the light guide plate, and the diffracting grating changes an angle at which the light is emitted from the light guide plate.

12. The backlight unit of claim 1, further comprising:
a 2-dimensional (2D) light guide plate disposed below the light guide plate; and
a light source that radiates light to the 2D light guide plate.

13. A holographic display comprising:
a light guide plate;
a light source unit configured to emit light to the light guide plate and adjust an incidence direction of the light to be incident on the light guide plate in the incidence direction;
a diffraction device which is disposed on and in contact with the light guide plate and configured to control an output direction of the light to be outputted from the diffraction device in the output direction; and
a spatial light modulator that displays a holographic image by modulating a beam that passed through the diffraction device,
wherein the light source unit is further configured to change an incidence angle of the light to be incident on the light guide plate and the diffraction device is further configured to control the output direction of the light according to the incidence angle of the light,
wherein light incident on the diffraction device in a first incidence angle by the light source unit passes through the spatial light modulator to display an image in a first viewing area, and light incident on the diffraction device in a second incidence angle by the light source unit passes through the spatial light modulator to display an image in a second viewing area, and
wherein both the light source unit and the diffraction device are provided in the output direction of the light on the light guide plate and an area of the diffraction device is wider than an area of the light guide plate on which the light from the light source unit is incident.

14. The holographic display of claim 13, wherein the light source unit comprises a plurality of light sources, and the plurality of light sources are arranged to have different light output directions.

15. The holographic display of claim 13, wherein the light source unit comprises:
at least one light source; and
a beam steering unit that adjusts a light output direction of the at least one light source.

16. The holographic display of claim 15, wherein the beam steering unit comprises a first driver that rotates the at least one light source.

17. The holographic display of claim 15, wherein the beam steering unit comprises:
a mirror that reflects light emitted from the at least one light source to be incident on the light guide plate; and
a second driver that rotates the mirror.

18. The holographic display of claim 15, wherein the beam steering unit comprises:
a refraction surface that refracts light emitted from the at least one light source to be incident on the light guide plate; and
an active optical element that adjusts an incidence angle of light incident on the light guide plate based on a tilt angle of the refraction surface.

19. The holographic display of claim 18, wherein the active optical element comprises an electrowetting prism or a refractive index converting device.

20. The holographic display of claim 13, wherein the light source unit comprises a coherent light source.

21. The holographic display of claim 13, further comprising:
a sensor configured to track we-eyes of a viewer; and
a controller configured to control the light source unit to adjust the incidence direction of the light according to a signal detected by the sensor.

22. The holographic display of claim 13, further comprising:
a 2-dimensional (2D) light guide plate disposed below the light guide plate; and
a light source that radiates light to the 2D light guide plate.

* * * * *